United States Patent
Kodali

(10) Patent No.: US 9,578,571 B2
(45) Date of Patent: *Feb. 21, 2017

(54) PAGING FOR CIRCUIT SWITCHED FALLBACK (CSFB) IN LONG TERM EVOLUTION (LTE) CONNECTED MODE

(71) Applicant: Apple Inc., Cupertino, CA (US)

(72) Inventor: Sree Ram Kodali, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,639

(22) Filed: Aug. 31, 2015

(65) Prior Publication Data

US 2016/0100344 A1    Apr. 7, 2016

Related U.S. Application Data

(63) Continuation of application No. 13/900,745, filed on May 23, 2013, now Pat. No. 9,125,122.

(60) Provisional application No. 61/657,767, filed on Jun. 9, 2012.

(51) Int. Cl.
*H04W 36/00* (2009.01)
*H04W 36/14* (2009.01)
*H04W 68/02* (2009.01)
*H04W 76/04* (2009.01)
*H04W 68/12* (2009.01)
*H04W 88/06* (2009.01)

(52) U.S. Cl.
CPC ......... *H04W 36/14* (2013.01); *H04W 36/0022* (2013.01); *H04W 68/02* (2013.01); *H04W 76/046* (2013.01); *H04W 68/12* (2013.01); *H04W 88/06* (2013.01)

(58) Field of Classification Search
CPC .... H04W 36/14; H04W 76/046; H04W 68/02; H04W 36/0022; H04W 88/06; H04W 68/12
USPC ..... 455/437, 435.2, 439, 444, 448; 370/328, 370/331
See application file for complete search history.

(56) References Cited

U.S. PATENT DOCUMENTS

| | | | | |
|---|---|---|---|---|
| 7,167,705 | B2 * | 1/2007 | Maes | H04W 4/24 455/411 |
| 8,682,283 | B2 * | 3/2014 | Kodali | H04W 76/027 455/404.1 |
| 8,903,380 | B2 * | 12/2014 | Unger | H04W 48/18 455/404.2 |
| 9,125,122 | B2 * | 9/2015 | Kodali | H04W 36/14 |

(Continued)

FOREIGN PATENT DOCUMENTS

WO    2011073884    6/2011
WO    2012138374    10/2012

*Primary Examiner* — Mong-Thuy Tran
(74) *Attorney, Agent, or Firm* — Downey Brand LLP

(57) ABSTRACT

Methods, apparatuses and computer readable media are described that analyze and communicate signaling messages between a mobile wireless device and a wireless access network to realize a circuit switched fallback (CSFB) procedure when the mobile wireless device is initially in a radio resource control connected mode with the wireless network. A set of information elements of a paging message is analyzed, and based on contents of the set of information elements and an internal state of the mobile wireless device, connections between the mobile wireless device and first and second wireless access networks are changed to realize the CSFB procedure.

20 Claims, 13 Drawing Sheets

(56) References Cited

U.S. PATENT DOCUMENTS

| | | | |
|---|---|---|---|
| 2010/0234026 A1* | 9/2010 | Tenny | H04W 36/0061 |
| | | | 455/436 |
| 2010/0303041 A1* | 12/2010 | Diachina | H04W 36/14 |
| | | | 370/331 |
| 2010/0316034 A1* | 12/2010 | Burbidge | H04W 36/0022 |
| | | | 370/338 |
| 2010/0317348 A1* | 12/2010 | Burbidge | H04W 36/0066 |
| | | | 455/436 |
| 2011/0002327 A1 | 1/2011 | Dwyer et al. | |
| 2011/0122862 A1 | 5/2011 | Yun et al. | |
| 2011/0128904 A1 | 6/2011 | Gou et al. | |
| 2011/0207427 A1 | 8/2011 | Kitani et al. | |
| 2012/0009952 A1 | 1/2012 | Zhang et al. | |
| 2012/0014345 A1 | 1/2012 | Faurie et al. | |
| 2012/0122459 A1 | 5/2012 | Wu et al. | |
| 2012/0176908 A1 | 7/2012 | Lee | |
| 2012/0208585 A1* | 8/2012 | Aoyagi | H04W 48/08 |
| | | | 455/515 |
| 2012/0258707 A1 | 10/2012 | Mathias et al. | |
| 2012/0270545 A1 | 10/2012 | Zhao et al. | |
| 2013/0028069 A1* | 1/2013 | Pelletier | H04W 72/0453 |
| | | | 370/216 |
| 2013/0044696 A1 | 2/2013 | Dalal et al. | |
| 2013/0051214 A1 | 2/2013 | Fong et al. | |
| 2013/0155954 A1 | 6/2013 | Wang et al. | |
| 2013/0250854 A1 | 9/2013 | Davis et al. | |
| 2014/0016614 A1 | 1/2014 | Velev et al. | |

* cited by examiner

PAGING FOR CIRCUIT SWITCHED FALLBACK (CSFB) IN LONG TERM EVOLUTION (LTE) CONNECTED MODE

CROSS-REFERENCE TO RELATED APPLICATIONS

This application is a continuation of U.S. patent application Ser. No. 13/900,745, filed on May 23, 2013, now U.S. Pat. No. 9,125,122, issued on Sep. 1, 2015, which claims the benefit of U.S. Provisional Application No. 61/657,767, filed Jun. 9, 2012, the contents of each which are incorporated by reference herein in their entirety.

TECHNICAL FIELD

The described embodiments generally relate to methods and apparatuses for managing radio connections between mobile wireless devices and one or more wireless networks. More particularly, the present embodiments describe signaling between a mobile wireless device and a wireless network to realize a circuit switched fallback (CSFB) procedure when the mobile wireless device is initially in a radio resource control (RRC) connected mode with the wireless network.

BACKGROUND

Wireless networks continue to evolve as new communication technologies develop and standardize. Wireless network operators can deploy new communication technologies in parallel with earlier generation communication technologies, and wireless networks can support multiple communication technologies simultaneously to provide smooth transitions through multiple generations of mobile wireless devices. Mobile wireless devices can include hardware and software to support wireless connections to different types of wireless networks that use different wireless communication technologies. Wireless networks using different radio access technologies (RATs) can overlap in geographic area coverage, and mobile wireless devices can support connections using different RATs depending on services and/or coverage available. A wireless service provider can provide services to mobile wireless devices through overlapping wireless networks, and mobile wireless devices can connect to one or more of the overlapping wireless networks. In a representative embodiment, a wireless service provider and/or a mobile wireless device can include simultaneous support for a Third Generation Partnership Project (3GPP) Long Term Evolution (LTE) wireless communication protocol and a "legacy" third generation (and/or earlier generation) wireless communication protocol. Representative "legacy" protocols include the Third Generation Partnership Project 2 (3GPP2) Code Division Multiple Access (CDMA) 2000 1× (also referred to as 1×RTT or 1×) wireless communication protocol, the 3GPP Universal Mobile Telecommunications System (UMTS) wireless communication protocol, and the 3GPP Global System for Mobile Communications (GSM) wireless communication protocol.

Mobile wireless devices can include a combination of hardware and software to connect to multiple wireless networks that use different wireless communication protocols. Representative mobile wireless devices can support circuit switched (CS) voice connections through a first wireless access network that uses a legacy wireless communications protocol, e.g., the CDMA 2000 1× wireless communication protocol, and packet switched (PS) connections (voice or data) through a second wireless access network that uses the LTE wireless communication protocol. Additional representative mobile wireless devices can support CS voice connections through a UMTS wireless network or through a GSM wireless network and can support PS data or voice connections through an LTE wireless network. In some embodiments, the LTE wireless network and/or the mobile wireless device can be unable to support PS voice connections (yet able to support PS data connections), and the mobile wireless device can use a CSFB procedure to revert to a CS voice connection through a legacy wireless network. The mobile wireless device can operate in cooperation with the LTE wireless network and with the legacy wireless network to suspend a PS data connection with or disconnect from the LTE wireless network to originate or terminate a CS voice connection through the legacy wireless network, e.g., through a CDMA 2000 1× wireless network, a UMTS wireless network, or a GSM wireless network. While the mobile wireless device can use the LTE wireless network for PS data connections, when the mobile wireless device originates an outgoing voice connection or responds to an incoming voice connection, the mobile wireless device can transition from using the LTE wireless network to using a legacy wireless network that supports CS voice connections. When the CS voice connection completes, the mobile wireless device can subsequently return to the LTE wireless network for PS data connections.

The 3GPP standardized LTE wireless communication protocol specifies multiple options for CSFB procedures including messages and responses for when a mobile wireless device is in different connection states with the LTE wireless network. The LTE wireless communication protocol includes two possible connection states that can exist between the mobile wireless device and the LTE wireless network, namely a radio resource control (RRC) connected state and an RRC idle state. The CSFB procedures for each connection state can differ in the sequence of messages and responses communicated between the mobile wireless device and the LTE wireless network. In certain circumstances, the mobile wireless device and the LTE wireless network can become misaligned with respect to each other concerning the connection state that exists between them, e.g., the mobile wireless device can assume an RRC connected state exists with the LTE wireless network, while the LTE wireless network can assume an RRC idle state exists with the mobile wireless device. Following the standardized CSFB procedures, the LTE wireless network can send one or more messages to the mobile wireless device based on a first connection state, and the mobile wireless device can ignore the one or more messages from the LTE wireless network because it assumes a second different connection state. In such a scenario, the mobile wireless device can miss an incoming voice connection indicated by the LTE wireless network because of the misaligned connection states between the mobile wireless device and the LTE wireless network. Thus, there exists a need for a method to support alternate CSFB procedures to establish mobile terminated voice connections when the mobile wireless device is in one connection state, e.g., an RRC connected state, and the LTE wireless network assumes a different connection state, e.g., an RRC idle state.

The teachings described herein can be applied to mobile wireless devices that can operate in dual (or more generally multiple) wireless communication technology networks. In particular, the teachings disclosed herein can pertain to mobile wireless devices that switch from using one wireless technology for a first connection (e.g., a PS data connection) to another wireless technology for a second connection (e.g., a CS voice connection).

SUMMARY OF THE DESCRIBED EMBODIMENTS

The described embodiments generally relate to methods and apparatuses for managing radio connections between mobile wireless devices and one or more wireless networks. More particularly, the present embodiments describe signaling between a mobile wireless device and a wireless network to realize a circuit switched fallback procedure when the mobile wireless device is initially in a radio resource control connected mode with the wireless network.

In an embodiment, a method to respond to paging messages by a mobile wireless device is described. The method includes at least the following steps executed by the mobile wireless device. The mobile wireless device receives a paging message from a first wireless network. The mobile wireless device determines that the paging message includes a first information element that uniquely identifies the mobile wireless device. The mobile wireless device also determines that the paging message includes a second information element that indicates the paging message originates from a second wireless network. The mobile wireless device further determines that the paging message does not include a third information element that indicates the paging message is a public warning system message. When an internal state of the mobile wireless device indicates that the mobile wireless device is connected to the first wireless network, after receiving the paging message and after determining that the paging message includes the first and second information elements and does not include the third information element, the mobile wireless device disconnects from the first wireless network and establishes a connection to the second wireless network. In a representative embodiment, the first wireless network operates according to an LTE wireless communication protocol, and the second wireless network operates according to a non-LTE wireless communication protocol.

In another embodiment, a mobile wireless device is described. The mobile wireless device includes at least one or more processors, one or more transmitters, and one or more receivers. The one or more processors are configured to control establishing and releasing connections between the mobile wireless device and a first wireless network and a second wireless network. The one or more transmitters are configured to transmit signals to the first wireless network according to a first wireless communication protocol and to the second wireless network according to a second wireless communication protocol. The one or more receivers are configured to receive signals from the first and second wireless networks. The one or more processors are further configured to obtain a paging message received by the one or more receivers from the first wireless network. The one or more processors are configured to determine that the paging message includes a first information element that uniquely identifies the mobile wireless device. The one or more processors are also configured to determine that the paging message includes a second information element indicating that the paging message originates from the second wireless network. The one or more processors are additionally configured to determine that the paging message does not include a third information element indicating the paging message is a public warning system message. When an internal state of the mobile wireless device indicates that the mobile wireless device is connected to the first wireless network, upon receipt of the paging message, and when the paging message includes the first and second information elements and does not include the third information element, the one or more processors of the mobile wireless device are configured to disconnect the mobile wireless device from the first wireless network and establish a connection of the mobile wireless device to the second wireless network. In a representative embodiment, the second information element indicates that the second wireless network is a circuit switched (CS) network and that the first wireless network is a packet switched (PS) network.

In another embodiment, a computer program product encoded as computer program code in a non-transitory computer readable medium for responding to paging messages by a mobile wireless device is described. The computer program product includes at least the following computer program code. Computer program code for receiving a paging message from a first wireless network. Computer program code for determining that the paging message includes a first information element that uniquely identifies the mobile wireless device. Computer program code for determining that the paging message includes a second information element indicating that the paging message originates from a second wireless network. Computer program code for determining that the paging message does not include a third information element indicating that the paging message is a public warning system message. Computer program code for, when an internal state of the mobile wireless device indicates that the mobile wireless device is connected to the first wireless network upon receiving the paging message and after executing the computer program code for determining that the paging message includes the first and second information elements and does not include the third information element, disconnecting the mobile wireless device from the first wireless network and establishing a connection of the mobile wireless device to the second wireless network. In a representative embodiment, the computer program code for disconnecting the mobile wireless device from the first wireless network comprises computer program code for releasing a first radio resource control (RRC) connection to the first wireless network locally in the mobile wireless device. In a further representative embodiment, the computer program code for disconnecting the mobile wireless device from the first wireless network comprises computer program code for establishing a second RRC connection to the first wireless network, computer program code for sending an extended service request message to the first wireless network, the extended service request message indicating a positive circuit switched fallback (CSFB) response to the paging message, and computer program code for receiving a signaling message from the first wireless network, the signaling message indicating release of the second RRC connection and redirection of the mobile wireless device to the second wireless network.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
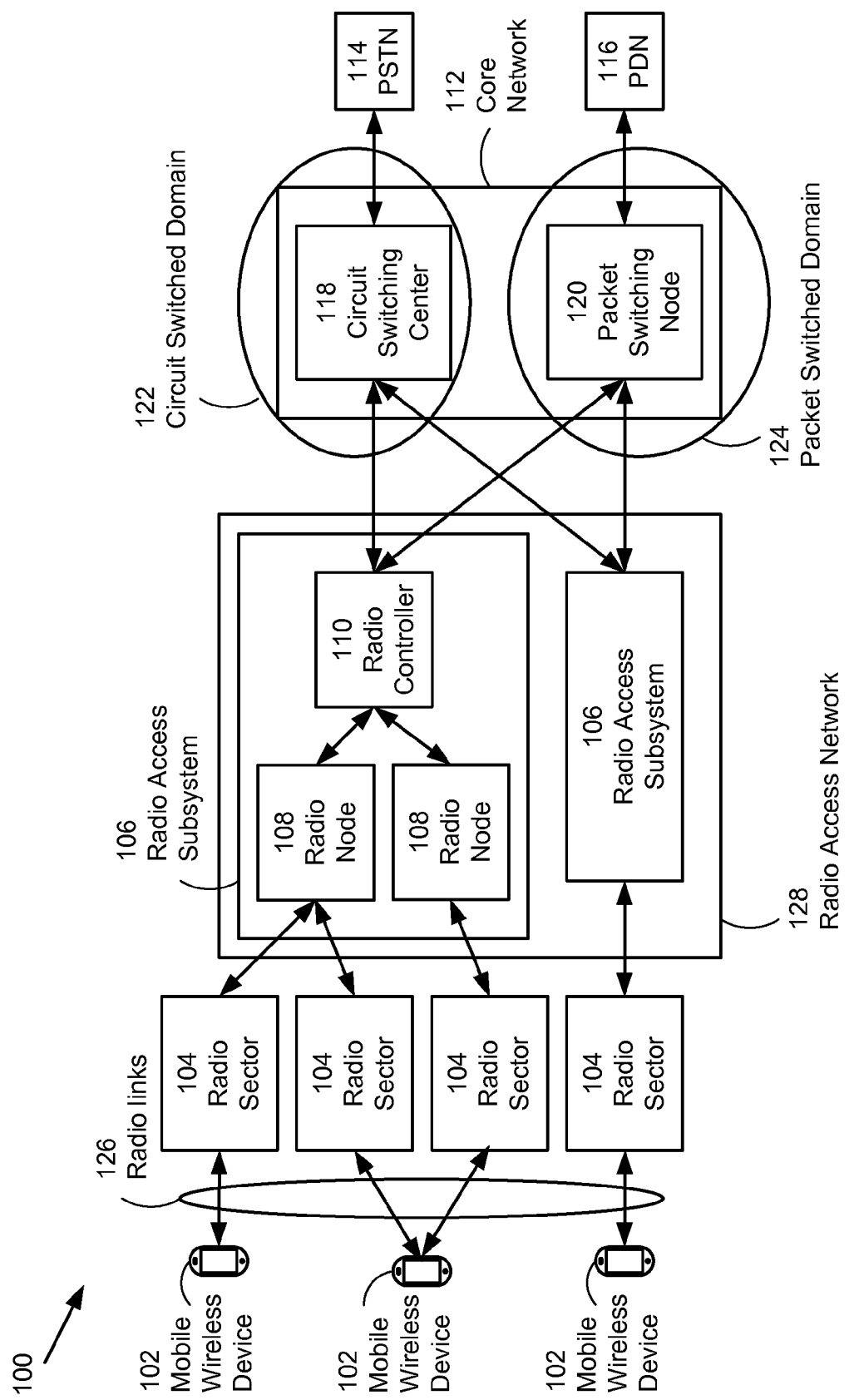
FIG. 1 illustrates components of a generic wireless communication network.

Representative applications of methods and apparatuses according to the present disclosure are described in this section. The examples presented are provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the scope of the described embodiments.

Wireless networks continue to evolve as network operators deploy equipment for new wireless communication technologies based on ongoing standardization efforts. Mobile wireless devices can provide capabilities to communicate with wireless networks based on two or more different wireless communication technologies, e.g. GSM and UMTS, UMTS and LTE, or CDMA 2000 1× and LTE. Newer wireless network technologies can offer advanced capabilities, while legacy wireless network technologies can provide greater geographic area coverage and/or different wireless service implementations. Wireless networks and mobile wireless devices that offer communication capabilities for multiple wireless network technologies can provide in parallel a wider range of services and greater coverage.

It should be understood that implementations of the same methods and apparatuses described herein can apply to mobile wireless devices that operate in different types of wireless networks, particularly one or more wireless networks that offer connections using two or more different generations or types of wireless communication protocols. For example, the same teachings can be applied to a combination of LTE and GSM networks, LTE and UMTS networks, LTE and CDMA 2000 1× networks or other "combined" multiple radio access technology (multi-RAT) wireless networks.

LTE wireless networks can provide for packet switched (PS) connections with mobile wireless devices, with a voice connection supported through a voice-over-LTE (VoLTE) service using a PS connection; however, some LTE wireless networks may not support VoLTE services. In addition, LTE wireless network technology will be installed over many years, and therefore wireless network operators will continue to operate wireless networks supporting legacy wireless network technologies in parallel with wireless networks using newer LTE wireless network technology. To ensure a mobile wireless device can establish voice connections using legacy technologies in parallel with newer LTE wireless network technology, the LTE wireless communication protocol includes a CSFB procedure so that the mobile wireless device can switch from the LTE wireless network to a legacy wireless network. To receive a mobile terminated voice connection over a legacy wireless network, the mobile wireless device is notified of the incoming voice connection in order to switch from the LTE wireless network to the legacy wireless network. When the mobile wireless device is in an RRC idle state, the LTE wireless network can send a paging message to the mobile wireless device indicating an incoming voice call. The paging message can include a particular information element (IE) containing a core network (CN) domain parameter that indicates that a page to establish a voice connection originates from a circuit switched (CS) domain. The mobile wireless device and the LTE wireless network can exchange a series of signaling messages that ultimately redirect the mobile wireless device to disconnect from the LTE wireless network and connect to a legacy wireless network through which a CS voice connection can be established. When the mobile wireless device is in an RRC connected state, the LTE wireless network can be precluded from sending a paging message having the CN domain parameter set to the CS domain. Instead, the LTE wireless network can send a CS service notification message to the mobile wireless device, and again after an exchange of signaling messages, the mobile wireless device can be redirected from the LTE wireless network to a legacy wireless network over which to establish a CS voice connection. If the mobile wireless device, however, is in an RRC connected state, a paging message having the CN domain parameter set to the CS domain sent by the LTE wireless network to the mobile wireless device can be ignored, and the mobile wireless device can miss establishing an intended mobile terminated voice connection over a legacy wireless network. The LTE wireless network can send the paging message with the CS domain set to the mobile wireless device instead of the CS service notification message in certain circumstances, e.g., when a connected state of the mobile wireless device at the mobile wireless device differs from a connected state of the mobile wireless device at the LTE wireless network.

Several scenarios described further herein illustrate circumstances in which the state of a connection between the mobile wireless device and the LTE wireless network can be misaligned. In some circumstances, an internal state of the mobile wireless device can be in an RRC connected state, while the LTE wireless network can consider the mobile wireless device to be in an RRC idle state. In this case, the mobile wireless device would expect a CS service notification message to initiate a CSFB procedure (as for an RRC connected state) rather than a paging message with CS domain set (as for an RRC idle state). In response to an indication from a legacy wireless network of an incoming mobile terminated voice connection, the LTE wireless network can send a paging message having the CN domain parameter set to the CS domain, as the LTE wireless network can consider the mobile wireless device to be in an RRC idle state. In a representative embodiment, the mobile wireless device can undertake one or more actions to realize a CSFB procedure when a set of conditions is met in order to properly receive and process the paging message received from the LTE wireless network. In an embodiment, the mobile wireless device can identify when the paging message includes a user equipment (UE) identity IE that indicates that the paging message is intended for the particular mobile wireless device, i.e., the UE identity IE of the paging message uniquely identifies the particular mobile wireless device. The mobile wireless device can also identify that the CN domain IE of the paging message is set to a CS domain. The mobile wireless device can further determine that the paging message is not identified as a public warning system (PWS) notification, e.g., not a commercial mobile alert service (CMAS) paging message and not an earthquake and tsunami warning system (ETWS) paging message. When the received paging message is confirmed to meet this set of conditions, the mobile wireless device, even when in an RRC connected state, can respond to the received paging message having the CN domain set to CS to initiate a CSFB procedure.

In a representative embodiment, the mobile wireless device in an RRC connected state responds to the received paging message that indicates origination from a CS domain by releasing the RRC connection to the LTE wireless network, e.g., releasing an "internal" state of the mobile wireless device from the LTE wireless network and returning the "internal" state of the mobile wireless device to an RRC idle state. The mobile wireless device can subsequently respond to the received paging message using a sequence of signaling messages identical to or similar to those signaling messages that would be used when receiving the same paging message when in an RRC idle state. The mobile wireless device can establish a new RRC connection with the LTE wireless network. The mobile wireless device can send an extended service request message that provides a positive CSFB response indication to the LTE wireless network. The LTE wireless network, in response to the extended service request message, can release the new RRC connection and redirect the mobile wireless device to a legacy wireless network, e.g., a 2G/2.5G/3G (non-LTE) radio access network. The mobile wireless device can "camp" on the legacy wireless network and respond to the paging message indirectly received from the legacy wireless network in order to establish a mobile terminated CS voice connection through the legacy wireless network.

In another representative embodiment, the mobile wireless device in an RRC connected state can respond to a received paging message that indicates origination from a CS domain by sending an extended service request message that includes a positive CSFB response indication to the LTE wireless network (e.g., responding in a similar manner as when responding to receiving a CS service notification message from the LTE wireless network). If the LTE wireless network responds to the extended service request with an RRC connection release message that includes redirection to a legacy wireless network, the mobile wireless device can release the RRC connection with the LTE wireless network and camp on the legacy non-LTE wireless network. The mobile wireless device can respond to the paging message received indirectly from the legacy non-LTE wireless network to establish a mobile terminated CS voice connection over the legacy non-LTE wireless network. If the LTE wireless network does not positively acknowledge the extended service request sent by the mobile wireless device, then the mobile wireless device can "locally" release the RRC connection (e.g., by changing an "internal" state parameter) and proceed to establish a second RRC connection with the LTE wireless network followed sending by a second extended service request message that indicates a positive CSFB response to the LTE wireless network as described above. If the LTE wireless network positively acknowledges the second extended service request message with a redirection indication, then the mobile wireless device can release the second RRC connection and subsequently camp on and connect to the legacy wireless network in order to complete a voice connection through the legacy wireless network.

FIG. 1 illustrates a representative generic wireless network 100 that can include multiple mobile wireless devices 102 connected by radio links 126 to radio sectors 104 provided by a radio access network 128. Each radio sector 104 can represent a geographic area of radio coverage emanating from an associated radio node 108 using a radio frequency channel operating at a selected frequency. Each radio node 108 can generate one or more radio sectors 104 to which the mobile wireless device 102 can connect by one or more radio links 126. In some wireless networks 100, the mobile wireless device 102 can be connected to more than one radio sector 104 simultaneously. The multiple radio sectors 104 to which the mobile wireless device 102 can be connected can emanate from a single radio node 108 or from separate radio nodes 108 that can share a common radio controller 110. A group of radio nodes 108 together with the associated radio controller 110 can be referred to as a radio access subsystem 106. Typically each radio node 108 in a radio access subsystem 106 can include a set of radio frequency transmitting and receiving equipment mounted on an antenna tower, and the radio controller 110 connected to the radio nodes 108 can include electronic equipment for controlling and processing transmitted and received radio frequency signals. The radio controller 110 can manage the establishment, maintenance and release of the radio links 126 that connect the mobile wireless device 102 to the radio access network 128. The radio controller 110 and/or the radio nodes 108 can exchange messages with the mobile wireless devices 102 to establish connections and to release connections. The radio controller 110 and/or the radio nodes 108 can generate messages as well as forward messages received from other radio access subsystems 106 or other network elements of the generic wireless network 100.

Radio resources that form the radio links 126 in the radio sectors 104 can be shared among multiple mobile wireless devices 102 using a number of different multiplexing techniques, including time division, frequency division, code division, space division and combinations thereof. A radio resource control (RRC) signaling connection can be used to communicate between the mobile wireless device 102 and the radio controller 110 in the radio access subsystem 106 of the radio access network 128 including requests for and dynamic allocations of radio resources to multiple mobile wireless devices 102.

The radio access network 128, which provides radio frequency air link connections to the mobile wireless device 102, connects also to a core network 112 that can include a circuit switched domain 122, usually used for voice traffic, and a packet switched domain 124, usually used for data traffic. Radio controllers 110 in the radio access subsystems 106 of the radio access network 128 can connect to both a circuit switching center 118 in the circuit switched domain 122 and a packet switching node 120 in the packet switched domain of the core network 112. The circuit switching center 118 can route circuit switched traffic, such as a voice call, to a public switched telephone network (PSTN) 114. The packet switching node 120 can route packet switched traffic, such as a "connectionless" set of data packets, to a public data network (PDN) 116.

Figure 2:
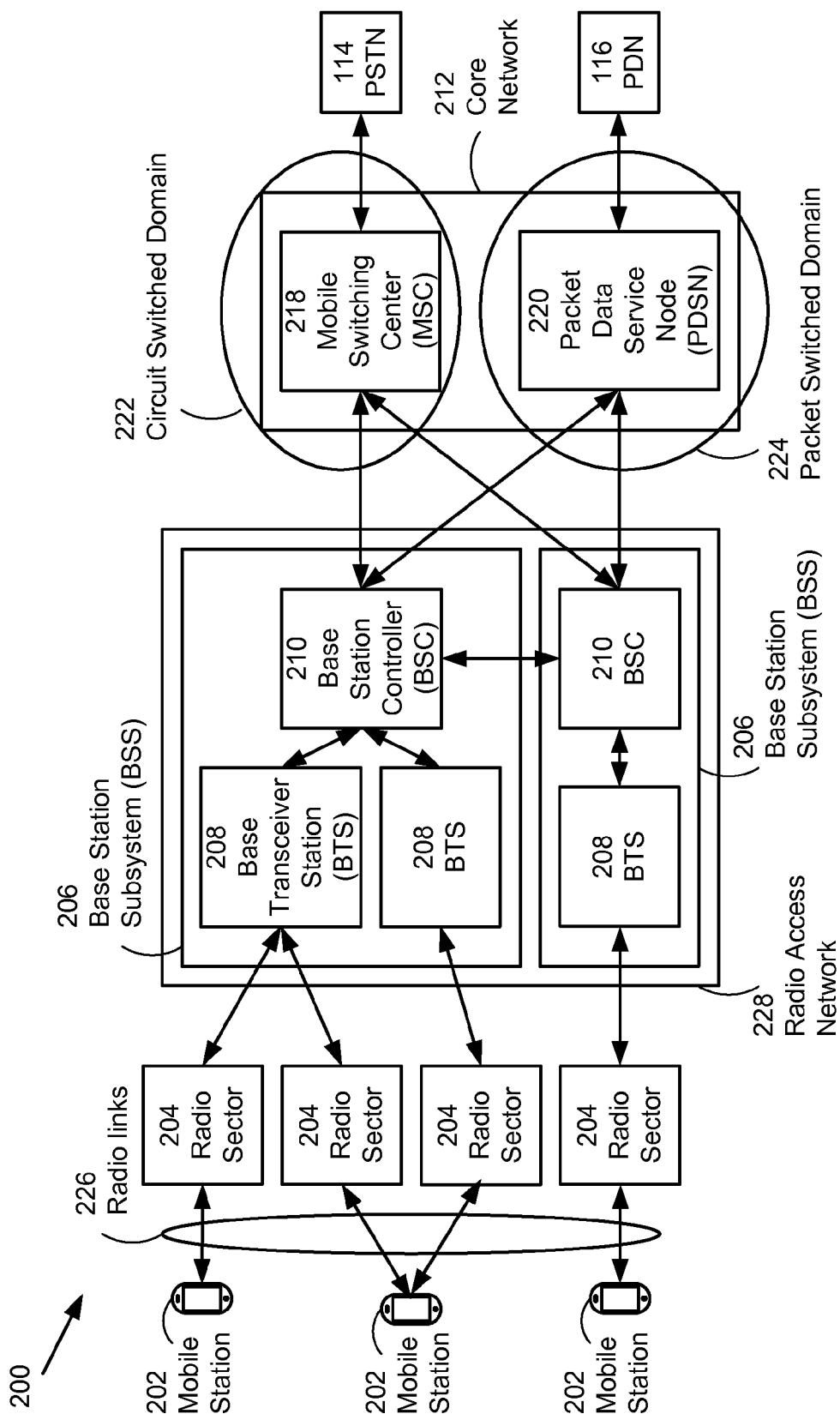
FIG. 2 illustrates components of a CDMA 2000 1× (RTT or EV-DO) wireless communication network.

FIG. 2 illustrates a representative CDMA 2000 1× wireless network 200 that can include elements comparable to those described for the generic wireless network 100 shown in FIG. 1. Multiple mobile stations 202 can connect to one or more radio sectors 204 through radio frequency links 226. Each radio sector 204 can radiate outward from a base transceiver station (BTS) 208 that can connect to a base station controller (BSC) 210, together forming a base station subsystem (BSS) 206. Multiple base station subsystems 206 can be aggregated to form a radio access network 228. Base station controllers 210 in different base station subsystems 206 can be interconnected. The base station controllers 210 can connect to both a circuit switched domain 222 that use multiple mobile switching centers (MSC) 218 and a packet switched domain 224 formed with packet data service nodes (PDSN) 220, which together can form a core network 212 for the wireless network 200. As with the generic wireless network 100 described above, the circuit switched domain 222 of the core network 212 can interconnect to the PSTN 114, while the packet switched domain 224 of the core network 212 can interconnect to the PDN 116. Establishing connections on the CDMA 2000 1× wireless network 200 can depend on the mobile station 202 receiving a page from the BSS 206 indicating an incoming connection. The mobile station 202 can listen for pages during specific paging intervals.

Figure 3:
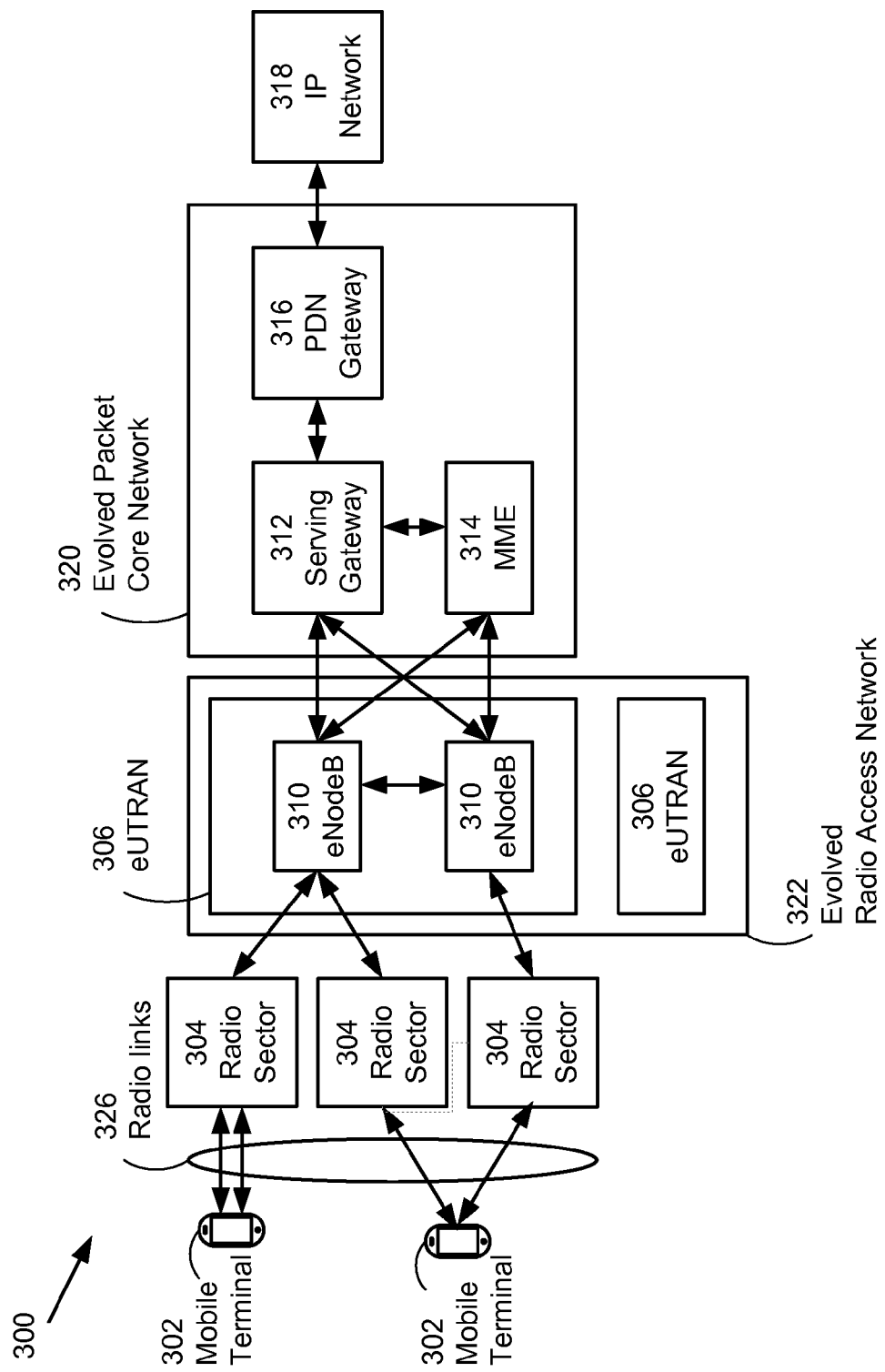
FIG. 3 illustrates components of an LTE (or an LTE-Advanced) wireless communication network.

FIG. 3 illustrates a representative Long Term Evolution (LTE) wireless network 300 architecture designed as a packet switched network exclusively. A mobile terminal 302 can connect to an evolved radio access network 322 through radio links 326 associated with radio sectors 304 that emanate from evolved Node B's (eNodeB) 310. The eNodeB 310 includes the functions of both transmitting and receiving base stations (such as the BTS 208 in the CDMA 2000 1× wireless network 200) as well as base station radio controllers (such as the BSC 210 in the CDMA 2000 1× wireless network 200). The equivalent core network of the LTE wireless network 300 is an evolved packet core network 320 including serving gateways 312 that interconnect the evolved radio access network 322 to public data network (PDN) gateways 316 that connect to external internet protocol (IP) networks 318. Multiple eNodeB 310 can be grouped together to form an evolved UMTS radio access network (eUTRAN) 306. The eNodeB 310 can also be connected to a mobility management entity (MME) 314 that can provide control over connections for the mobile terminal 302.

Figure 4:
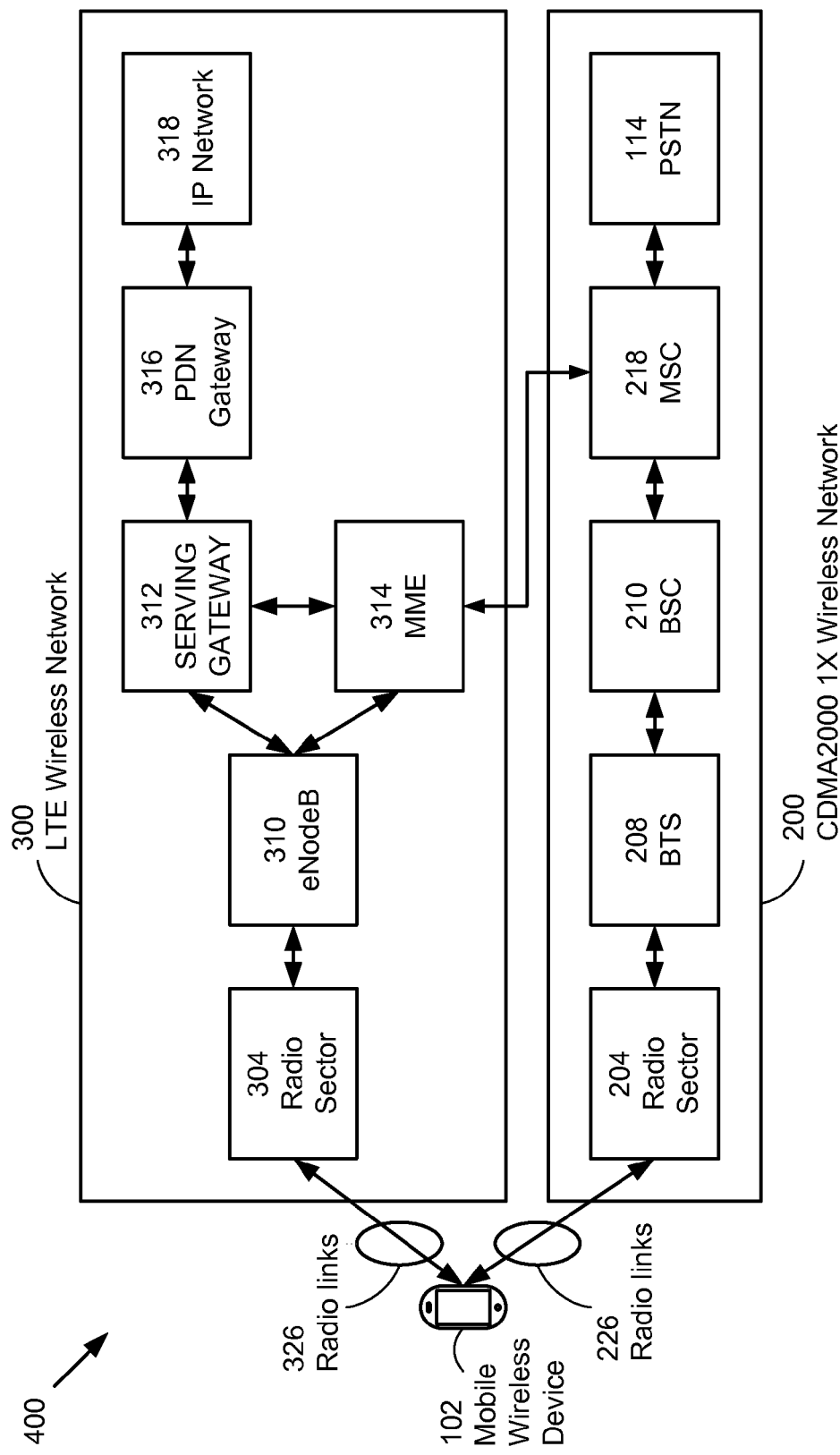
FIG. 4 illustrates a mobile wireless device communicating in parallel to the CDMA 2000 1× (RTT or EV-DO) wireless communication network of FIG. 2 and the LTE (or the LTE-Advanced) wireless communication network of FIG. 4.

FIG. 4 illustrates a diagram 400 of a mobile wireless device 102 in communication with both the LTE wireless network 300 and with the CDMA 2000 1× wireless network 200. The CDMA 2000 1× wireless network 200 can connect to the circuit switch based public switched telephone network (PSTN) 114 through a mobile switching center (MSC) 218. The MSC 218 of the CDMA 2000 1× wireless network 200 can be interconnected to the MME 314 of the LTE wireless network 300 to coordinate call signaling for the mobile wireless device 102. In some embodiments, the CDMA 2000 1× wireless network 200 can seek to establish a connection through the radio links 226 with the mobile wireless device 102, e.g. to establish a voice connection between the mobile wireless device 102 and the PSTN 114. If the mobile wireless device 102 is connected to the CDMA 2000 1× wireless network 200, then the CDMA 2000 1× wireless network 200 can transmit a paging message to the mobile wireless device 102 using the radio links 226 to indicate the availability of an incoming voice connection. When the mobile wireless device 102 is connected to the LTE wireless network 300, the CDMA 2000 1× wireless network can indicate an incoming voice call by providing an indication of the incoming voice call from the MSC 218 to the MME 314 of the LTE wireless network 300. The LTE wireless network 300 can then communicate an appropriate message to the mobile wireless device 102 to disconnect from the LTE wireless network 300 and "fall back" to the circuit switched CDMA 2000 1× wireless network 200 in order to receive the mobile terminated CS voice connection.

Representative embodiments of mobile wireless devices can connect to combinations of wireless networks that use different wireless technologies, in addition to those described above, and the embodiments described herein are not limited to the specific combination illustrated by FIG. 4. In particular, representative embodiments include mobile wireless devices that can communicate over the LTE wireless network 300 and over a GSM or UMTS wireless network. Other combinations of an LTE wireless network 300 and a wireless network using an earlier generation "legacy" wireless communication technology are also contemplated.

Figure 5:
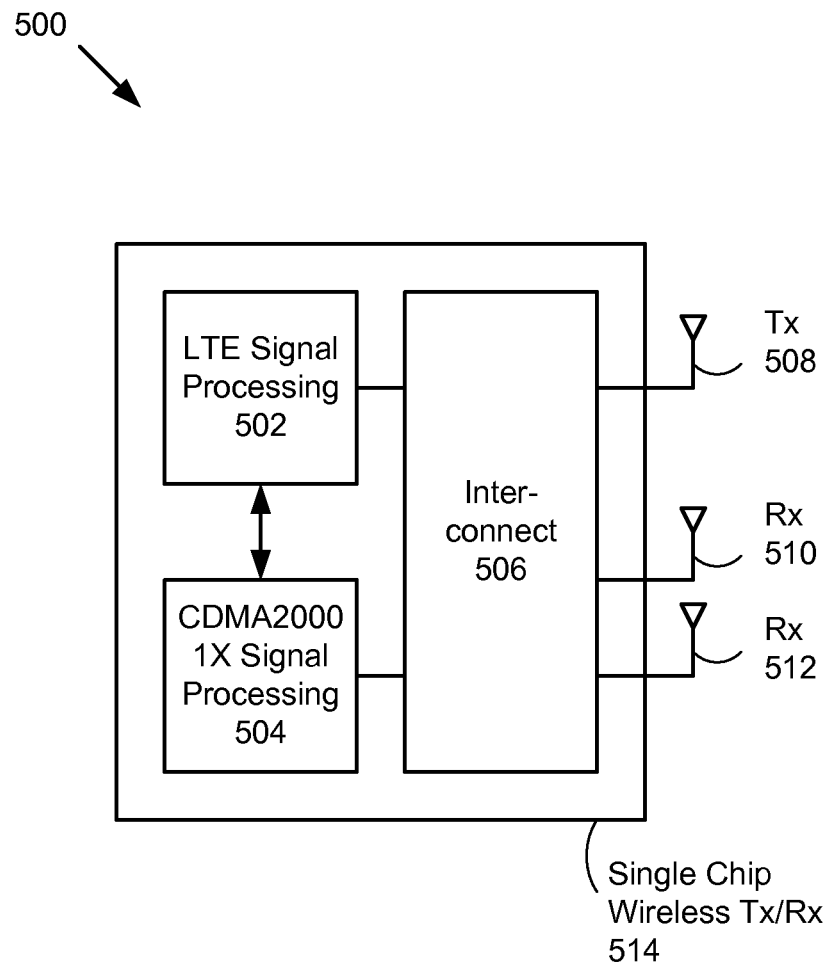
FIG. 5 illustrates elements of a representative single signal processing chip mobile wireless device.

FIG. 5 illustrates a diagram 500 of a representative single chip wireless transmitter/receiver 514 that can reside in a mobile wireless device 102 that can communicate with the LTE wireless network 300 or with the CDMA 2000 1× wireless network 200 separately but not simultaneously. When connected to the LTE wireless network 300, the single chip mobile wireless device 102 can use a single transmitter (Tx) 508 and dual receivers (Rx) 510/512. When connected to the CDMA 2000 1× wireless network 200, the single chip mobile wireless device 102 can use the single transmitter 508 and either one receiver (Rx 510 or Rx 512) or dual receivers (Rx 510 and Rx 512). Use of dual receivers for both the LTE wireless network 300 and the CDMA 2000 1× wireless network 200 can provide higher receive signal quality and therefore higher data throughput and/or greater connection reliability under adverse signal conditions. An interconnect block 506 can allow either an LTE signal processing 502 block or a CDMA 2000 1× signal processing block 504 to transmit and receive radio signals through the transmitter 508 and one or both of the receivers 510/512 respectively. Within the single chip wireless mobile wireless device 102, the single chip wireless transmitter/receiver 514 can be connected to one or more processors (not shown), e.g., an application processor, that can perform "higher layer" functions such as establishing connections for applications and forming messages to be communicated with various wireless networks, while the single chip wireless transmitter/receiver 514 can perform "lower layer" functions such as ensuring integrity of transmitted and received radio frequency signals that carry messages for the application processor.

Figure 6:
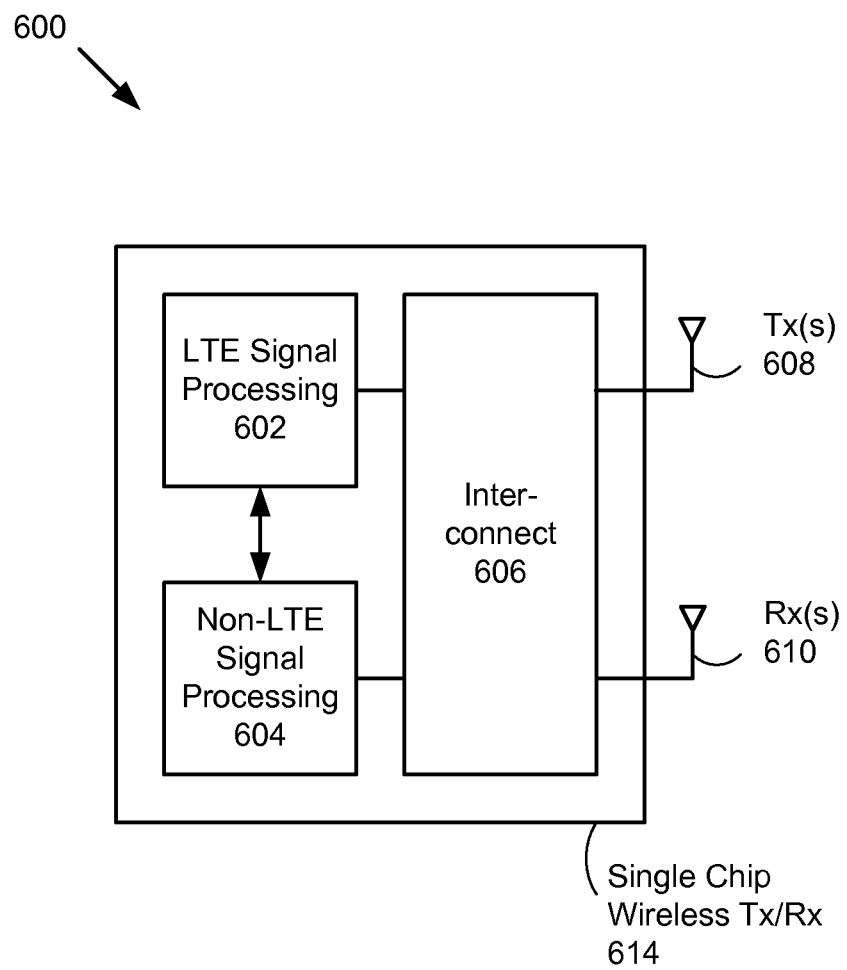
FIG. 6 illustrates elements of another representative single signaling processing chip mobile wireless device.

FIG. 6 illustrates a diagram 600 of another representative single chip wireless transmitter/receiver 614 that can reside in a mobile wireless device 102 that can communicate with the LTE wireless network 300 or with a non-LTE wireless network (e.g., a legacy wireless network), separately but not simultaneously. When connected to the LTE wireless network 300, the single chip mobile wireless device 102 that contains the single chip transmitter/receiver 614 can use one or more transmitters 608 and one or more receivers 610 for communication with either the LTE wireless network 300 or the non-LTE wireless network. In some embodiments, the mobile wireless device 102 can include an LTE processing block 602 that can be connected through an interconnect 606 to all or a subset of the transmitters 608 and receivers 610. The mobile wireless device 102 can also include a non-LTE processing block 604 that can also be connected through the interconnect 606 to all or a second subset of the transmitters 607 and receivers 610. The mobile wireless device 102 can re-use hardware elements, e.g., transmit and/or receive signaling chains, for two different wireless networks to which the mobile wireless device 102 can be connected. The mobile wireless device 102 can be connected to the LTE wireless network 300 for PS data connections and can be separately connected to a non-LTE wireless network (e.g., a GSM wireless network, a UMTS wireless network, or the CDMA 2000 1× wireless network 200) for CS voice connections. The mobile wireless device 102 can be preferably connected to the LTE wireless network 300 to realize higher throughput data connections and revert to the non-LTE wireless network when required to originate or terminate CS voice connections, e.g., when the LTE wireless network 300 and/or the mobile wireless device 102 does not support VoLTE type connections. In some embodiments, the mobile wireless device 102 obtains one or more signaling messages from the LTE wireless network 300 that directs the mobile wireless device 102 to connect to the non-LTE wireless network, e.g., to receive an incoming CS voice call.

Figure 7:
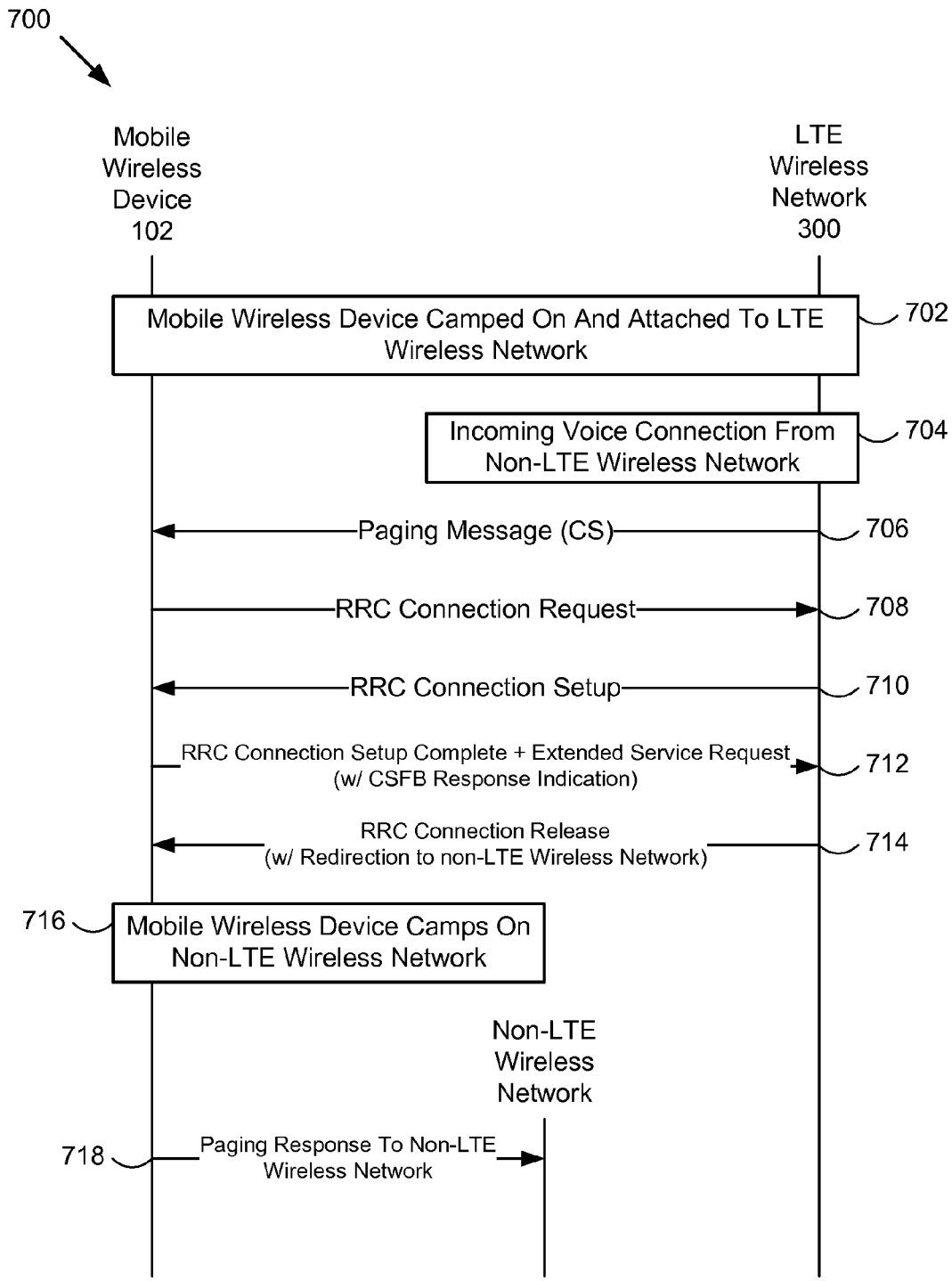
FIG. 7 illustrates a prior art signaling message exchange between a mobile wireless device in an RRC idle state and an LTE wireless network to realize a CSFB procedure.

FIG. 7 illustrates a prior art sequence 700 of messages exchanged between the mobile wireless device 102 and the LTE wireless network 300 for a CSFB procedure. Initially, in block 702, the mobile wireless device 102 can be camped on (registered with) the LTE wireless network 300. The mobile wireless device 102 can also be attached to the LTE wireless network 300 but not be connected to the LTE wireless network 300, i.e., no active RRC connection can exist between the mobile wireless device 102 and the LTE wireless network 300. Thus, both the mobile wireless device 102 and the LTE wireless network 300 can consider the connection state between them to be an RRC idle state. In block 704, the LTE wireless network 300 can obtain an indication of an incoming CS voice call for a non-LTE wireless network, i.e., the non-LTE wireless network can seek to form a CS connection with the mobile wireless device 102 to establish a mobile terminated voice call. As the LTE wireless network 300 considers the mobile wireless device 102 to be in an RRC idle state, the LTE wireless network 300 can send a paging message 706 to the mobile wireless device 102. The paging message 706 can include an information element indicating a core network domain from which the paging message 706 originates as a circuit switched (CS) domain. As the mobile wireless device 102 is in an RRC idle state, in response to the paging message 706, the mobile wireless device 102 can respond by sending an RRC connection request 708 to establish an RRC connection with the LTE wireless network 300. The LTE wireless network 300 can respond by sending an RRC connection setup message 710 to the mobile wireless device 102. In response, the mobile wireless device 102 can send an RRC connection setup complete message 712. Further in response to the paging message 706 that indicated the CS domain origination, the mobile wireless device 102 can send an extended service request with the RRC connection setup complete message that includes a positive CSFB indication. The mobile wireless device 102 can indicate to the LTE wireless network 300 an agreement to switch to a non-LTE wireless network in order to complete a connection over the CS non-LTE wireless network. The LTE wireless network 300 can respond by sending an RRC connection release message 714 that includes a redirection of the mobile wireless device 102 to the non-LTE wireless network. In block 716, the mobile wireless device 102 can switch away from the LTE wireless network 300 to camp on the non-LTE wireless network. Subsequently, the mobile wireless device 102 can provide a paging response 718 to the non-LTE wireless network. The mobile wireless device 102 can then establish a connection through the non-LTE wireless network to complete a mobile terminated voice connection through the non-LTE wireless network.

Figure 8:
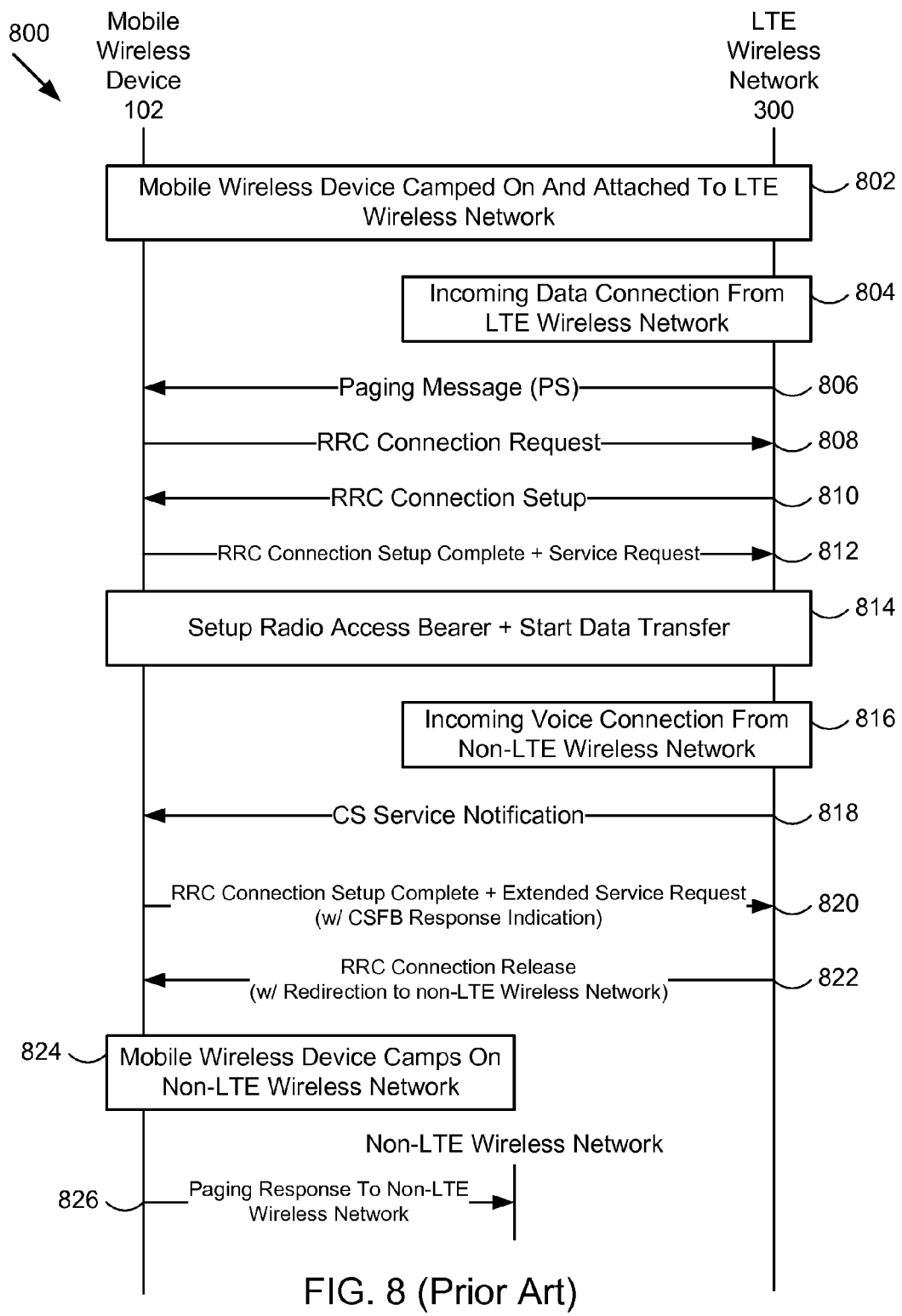
FIG. 8 illustrates a prior art signaling message exchange between a mobile wireless device in an RRC connected state and an LTE wireless network to realize a CSFB procedure.

FIG. 8 illustrates another prior art sequence 800 of messages exchanged between the mobile wireless device 102 and the LTE wireless network 300 for a CSFB procedure. Initially, in block 802, the mobile wireless device 102 can be camped on (registered with) the LTE wireless network 300. The mobile wireless device 102 can also be attached to the LTE wireless network 300 but not be connected to the LTE wireless network 300, i.e., no active RRC connection can exist between the mobile wireless device 102 and the LTE wireless network 300. Thus, both the mobile wireless device 102 and the LTE wireless network 300 can consider the connection state between them to be an RRC idle state. In block 804, the LTE wireless network 300 can initiate a data connection with the mobile wireless device 102. The LTE wireless network 300 can send a paging message 806 to the mobile wireless device 102. The paging message 806 can include an information element indicating a core network domain from which the paging message 806 originates as a packet switched (PS) domain. As the mobile wireless device 102 is in an RRC idle state, in response to the paging message 806, the mobile wireless device 102 can respond by sending an RRC connection request 808 to establish an RRC connection with the LTE wireless network 300. The LTE wireless network 300 can respond by sending an RRC connection setup message 810 to the mobile wireless device 102. In response, the mobile wireless device 102 can send an RRC connection setup complete message 812. The mobile wireless device 102 can further include a service request with the RRC connection setup complete message 812. In block 814, the LTE wireless network 300 and the mobile wireless device 102 can set up radio access bearers and initiate a transfer of packet switched data using the radio access bearers. During the active PS data connection, in block 816, the LTE wireless network 300 can receive an indication of an incoming CS voice call for a non-LTE wireless network, i.e., the non-LTE wireless network can seek to form a CS connection with the mobile wireless device 102 to establish a mobile terminated voice call. As the LTE wireless network 300 considers the mobile wireless device 102 to be in an RRC connected state, the LTE wireless network 300 can send a CS service notification 818 to the mobile wireless device 102. As the mobile wireless device 102 is in an RRC connected state, in response to the CS service notification 818, the mobile wireless device 102 can send an RRC connection setup complete message 820 that includes an extended service request with a positive CSFB response indication to the LTE wireless network 300. The LTE wireless network 300 in response can send an RRC connection release message 822 to the mobile wireless device 102, the RRC connection release message 822 indicating redirection of the mobile wireless device 102 from the LTE wireless network 300 to a non-LTE wireless network. In block 824, the mobile wireless device 102 can switch away from the LTE wireless network 300 to camp on the non-LTE wireless network. Subsequently, the mobile wireless device 102 can provide a paging response 826 to the non-LTE wireless network. The mobile wireless device 102 can then establish a connection through the non-LTE wireless network to complete a mobile terminated voice connection through the non-LTE wireless network.

Figure 9:
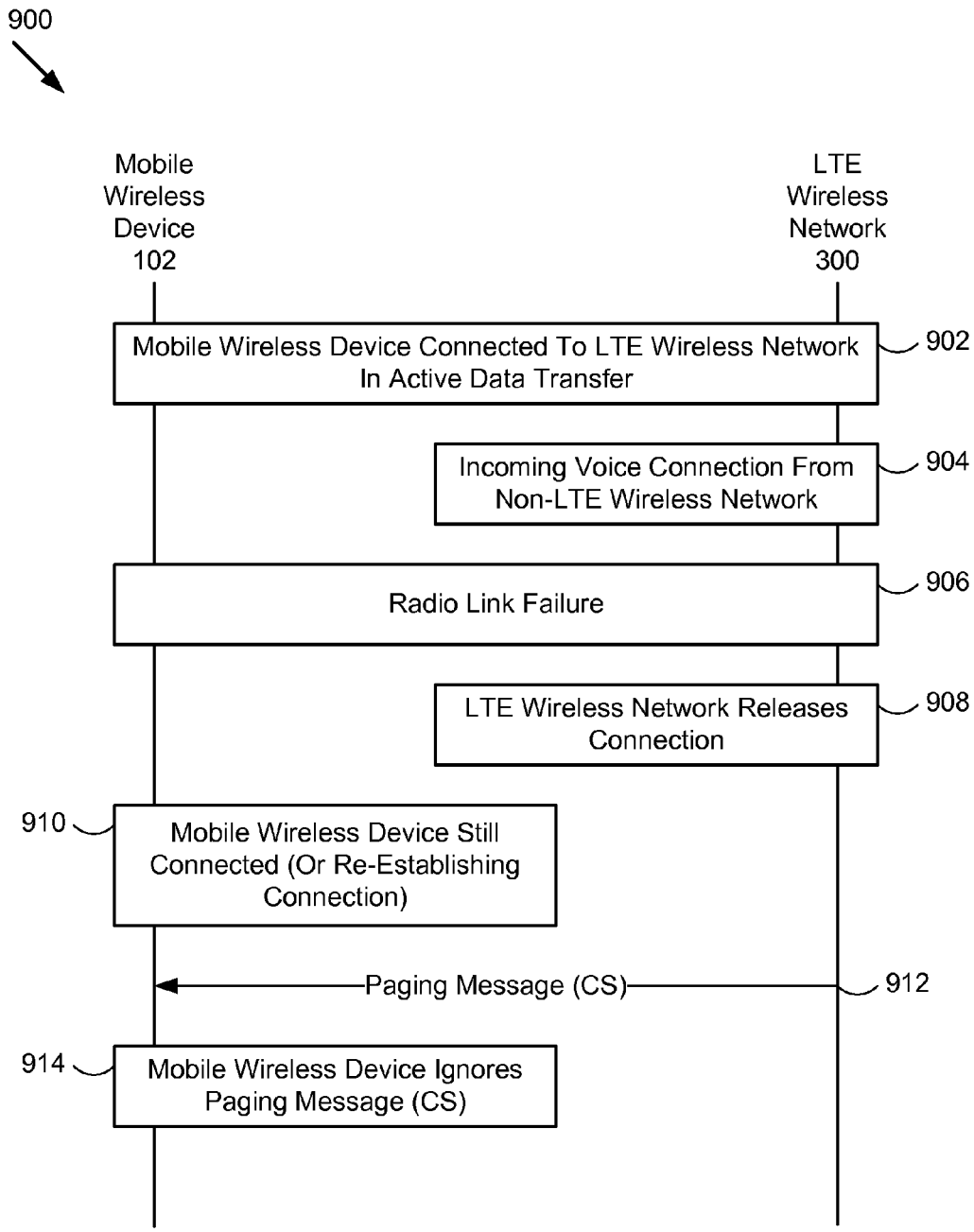
FIG. 9 illustrates another prior art signaling message exchange between a mobile wireless device in an RRC connected state and an LTE wireless network in an idle state resulting in an unsuccessful CSFB procedure.

FIGS. 7 and 8 illustrated successful signaling message exchanges between the LTE wireless network 300 and the mobile wireless device 102 that resulted in a mobile terminated CS connection over the non-LTE wireless network using a CSFB procedure. In some circumstances, the mobile wireless device 102 and the LTE wireless network 300 can become misaligned with respect to the RRC connection state, which can result in an unsuccessful attempt to establish a CS connection through a CSFB procedure. FIG. 9 provides an example of this misalignment.

FIG. 9 illustrates a prior art signaling message exchange 900 between the mobile wireless device 102 and the LTE wireless network 300. In block 902, the mobile wireless device 102 can be connected to and actively transferring data with the LTE wireless network 300. In block 904, during the active data transfer, the LTE wireless network 300 can receive an indication of an incoming CS voice call for a non-LTE wireless network, i.e., the non-LTE wireless network can seek to form a CS connection with the mobile wireless device 102 to establish a mobile terminated voice call. In block 906, the LTE wireless network 300 and the mobile wireless device 102 can lose their connection, e.g., due to a radio link failure between them. The mobile wireless device 102 and the LTE wireless network 300 can respond to the radio link failure differently (e.g., with different response times). In block 908, the LTE wireless network 300 can release the RRC connection with the mobile wireless device 102. In block 910, the mobile wireless device 102 can continue to be connected to (or seeking to re-establish a connection with) the LTE wireless network 300. The mobile wireless device 102 can continue to be in an RRC connected state (internal to the mobile wireless device 102), while the LTE wireless network 300 can consider the mobile wireless device 102 to be in an RRC idle state (having severed the RRC connection). In response to the incoming voice connection from the non-LTE wireless network in block 904, the LTE wireless network 300 can send a paging message with a core network domain IE set to a CS domain (as the LTE wireless network 300 considers the mobile wireless device 102 to be in an RRC idle state). The mobile wireless device 102, however, in block 914, can ignore the paging message from the LTE wireless network 300, as the paging message can be disallowed in the RRC connected state. With this sequence of events illustrated in FIG. 9, the mobile wireless device 102 can miss the attempt to form a CS voice connection communicated by the LTE wireless network 300 using the paging message 912. FIG. 9 provides an example in which misaligned connection states between the mobile wireless device 102 and the LTE wireless network 300 can result in an unsuccessful CSFB procedure.

FIG. 9 illustrates a scenario in which an RRC connection release message can be sent by the LTE wireless network 300 to the mobile wireless device 102, and because of poor radio conditions, the mobile wireless device 102 does not receive the RRC connection release message. The LTE wireless network 300 can locally release the RRC connection to the mobile wireless device 102 after a timer expires, thereby transitioning the mobile wireless device 102 to an RRC idle state. The mobile wireless device 102 can remain locally in an RRC connected state, as the mobile wireless device 102 did not receive the RRC connection release message. As shown in FIG. 9, the LTE wireless network 300 can transmit a paging message to initiate a CSFB procedure with the mobile wireless device 102, as the LTE wireless network 300 considers the mobile wireless device 102 to be in an RRC idle state. The mobile wireless device 102, which remains locally in an RRC connected state, ignores the paging message, as the paging message is not valid in an RRC connected state. In accordance with the 3GPP LTE wireless protocol specification, valid paging messages in an RRC connected state are restricted to (1) system information modification notifications, (2) public warning system (PWS) type messages, including CMAS and ETWS messages. Paging messages with the CS domain set are not allowed in the LTE RRC connected state, and thus the mobile wireless device 102 may ignore such messages.

In addition to the scenario described above for FIG. 9, other scenarios can arise in which the mobile wireless device 102 and the LTE wireless network 300 become misaligned with regard to connection states and/or communicated messages, the misalignment potentially resulting in a failed CSFB procedure. In one scenario, a radio link failure between the LTE wireless network 300 and the mobile wireless device 102 can result in a loss of one or more packet transmissions sent by the LTE wireless network 300 to the mobile wireless device 102. For example, the LTE wireless network 300 can send one or more radio link control (RLC) packet data units (PDUs), which can be not received by the mobile wireless device 102. As a result, the LTE wireless network can receive no acknowledgement (ACK) responses to the RLC PDUs. After a number of retries and/or timer expirations, the LTE wireless network 300 can locally release the RRC connection to the mobile wireless device 102, while the mobile wireless device 102, which is not receiving the data packets or other signaling messages due to the radio link failure, can remain locally in an RRC connected state. The LTE wireless network 300 and the mobile wireless device 102 can end up with misaligned connection states.

In a further scenario, a race condition can occur between an RRC connection setup message sent by the eUTRAN of the LTE wireless network 300 to the mobile wireless device 102 and a paging message with the CS domain indication sent by the evolved packet core network 320 of the LTE wireless network 300. The MME 314 of the evolved packet core network 320 can receive a paging indication from a non-LTE wireless network, e.g., the MSC 218 of the CDMA 2000 1× wireless network 200, and communicate the paging message to the eNodeB 310 to send to the mobile wireless device 102. The paging message, which can assume the mobile wireless device 102 is in an idle state, can be in conflict with the RRC connection setup message that initiates transition to an RRC connected state. The LTE wireless network 300 can send the paging message with the core network domain information element set to the circuit switched domain to the mobile wireless device 102 before receiving a response to the RRC connection setup message, i.e., before receiving the RRC connection setup complete message from the mobile wireless device 102. The mobile wireless device 102, however, can receive the paging message with CS domain after sending the RRC connection setup complete message to the LTE wireless network 300. As a result, the LTE wireless network 300 sends the paging message while still in an RRC idle state (RRC connection not completed), while the mobile wireless device 102 receives the paging message while in an RRC connected state. The mobile wireless device 102 in the RRC connected state can ignore the paging message having the CS domain set, and thus the CSFB procedure can fail.

In representative embodiments, the mobile wireless device 102 can accept a paging message having a core network domain information element set to the CS domain while in an RRC connected state when certain additional conditions are met. The mobile wireless device 102 can undertake one or more different actions after accepting the paging message that can result in a successful CSFB procedure.

Figure 10:
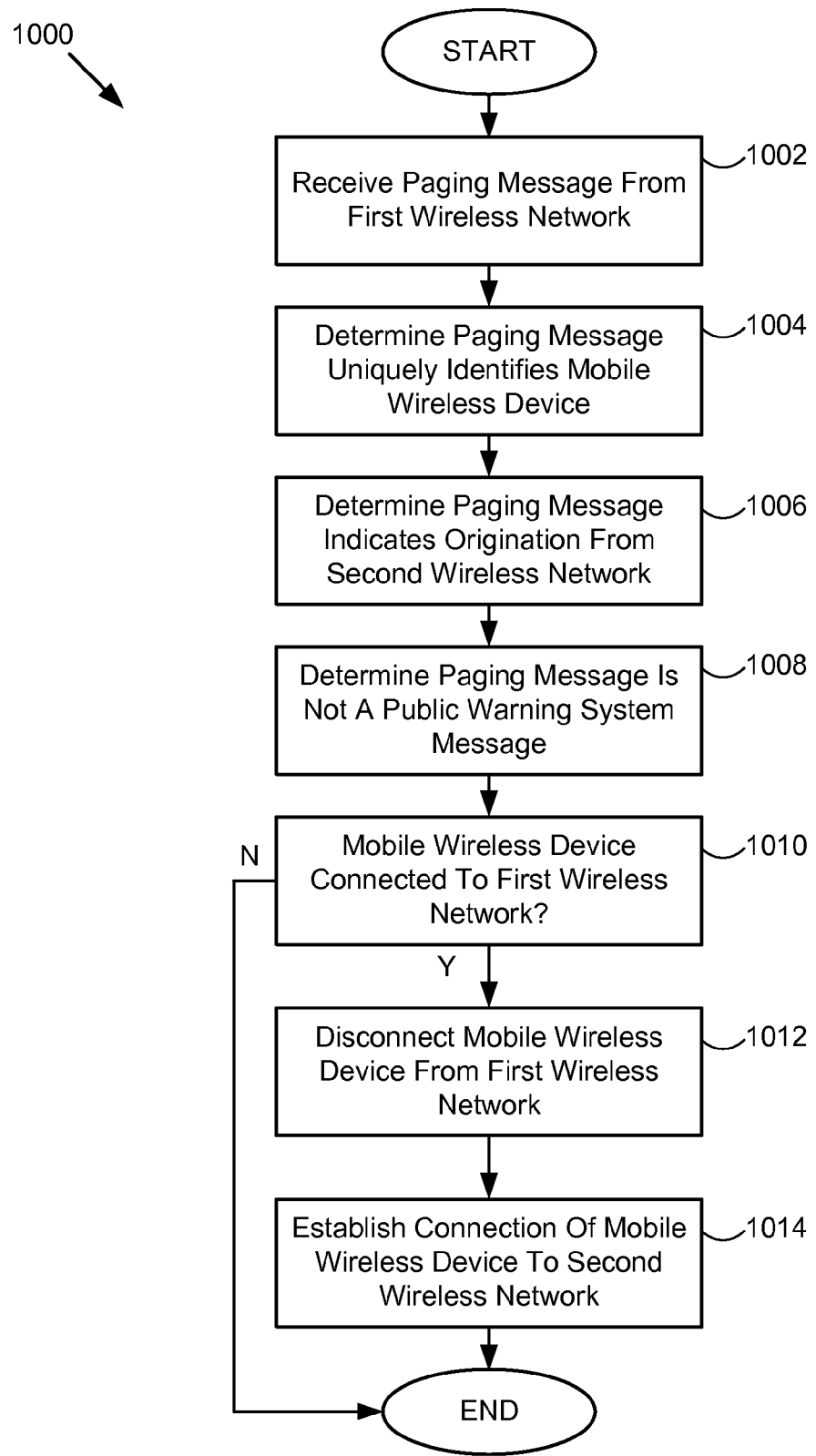
FIG. 10 illustrates a representative embodiment of a method to respond to paging messages received from a first wireless network by a mobile wireless device.

FIG. 10 illustrates a representative embodiment of a method 1000 to respond to paging messages received from a first wireless network by a mobile wireless device 102. In step 1002, the mobile wireless device 102 can receive a paging message from the first wireless network. In step 1004, the mobile wireless device 102 can determine whether the paging message uniquely identifies the mobile wireless device 102, e.g., includes a first information element that contains a parameter that uniquely identifies the particular mobile wireless device 102. In step 1006, the mobile wireless device 102 determines whether the paging message originates from a second wireless network different from the first wireless network, e.g., contains a second information element indicating origination of the paging message from the second wireless network. In step 1008, the mobile wireless device 102 determines whether the paging message is not a public warning system message, e.g., does not include a third information element that indicates that the paging message is a public warning message. In step 1010, when an internal state of the mobile wireless device 102 indicates that the mobile wireless device 102 is not connected to the first wireless network, e.g., in an RRC idle state, the method ends. In step 1010, when the internal state of the mobile wireless device 102 indicates that the mobile wireless device 102 is connected to the first wireless network, e.g., in an RRC connected state, the method continues. In step 1012, the mobile wireless device 102, disconnects from the first wireless network. In step 1014, the mobile wireless device 102 establishes a connection to the second wireless network.

In a representative embodiment of the method illustrated in FIG. 10, the paging element includes a second information element that indicates the second wireless network is a circuit switched (CS) network, and the first wireless network is a packet switched (PS) network. In another representative embodiment, the public warning system message is a commercial mobile alert service (CMAS) message or an earthquake and tsunami warning system (ETWS) message. In a representative embodiment, the paging message includes a first information element that includes a mobile subscriber identity that uniquely identifies the mobile wireless device 102, e.g., a temporary mobile subscriber identity (TMSI) or international mobile subscriber identity (IMSI). In an embodiment, the first wireless network operates according to a long-term evolution (LTE) wireless communication protocol, and the second wireless network operates according to a non-LTE wireless communication protocol. In an embodiment, the paging message includes an indication of an incoming mobile terminated voice call for the mobile wireless device 102 to be completed over the second wireless network.

Figure 11:
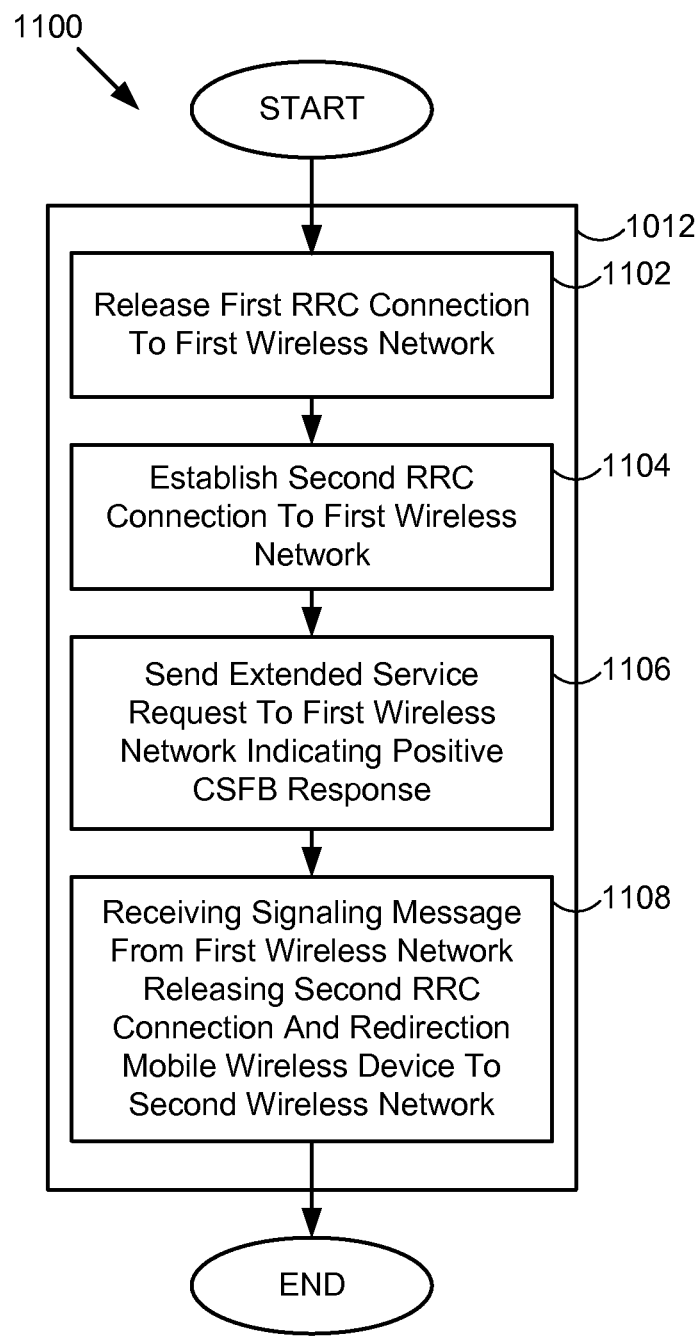
FIGS. 11 and 12 illustrate representative embodiments of method steps to disconnect the mobile wireless device from the first wireless network applicable to the method of FIG. 10.

FIG. 11 illustrates a representative embodiment of method steps 1100 to disconnect the mobile wireless device from the first wireless network applicable to the method of FIG. 10. In a representative embodiment, the method step 1012 of the method illustrated in FIG. 10 includes one or more of the steps illustrated in FIG. 11. In step 1102, the mobile wireless device 102 releases a first radio resource control (RRC) connection to the first wireless network, e.g., by changing an internal state of the mobile wireless device 102. In step 1104, the mobile wireless device 102 establishes a second RRC connection with the first wireless network. By releasing the RRC connection in step 1102, the mobile wireless device 102 returns to an RRC idle state. To respond to the paging message received from the first wireless network, the mobile wireless device 102 then establishes anew a second RRC connection to the first wireless network. In step 1106, the mobile wireless device 102 sends an extended service request message to the first wireless network, the extended service request message including an indication of a positive CSFB response to the received paging message. In step 1108, the mobile wireless device 102 receives a signaling message from the first wireless network, the signaling message indicating a release of the second RRC connection to the first wireless network and also including a redirection of the mobile wireless device 102 from the first wireless network to the second wireless network.

Figure 12:
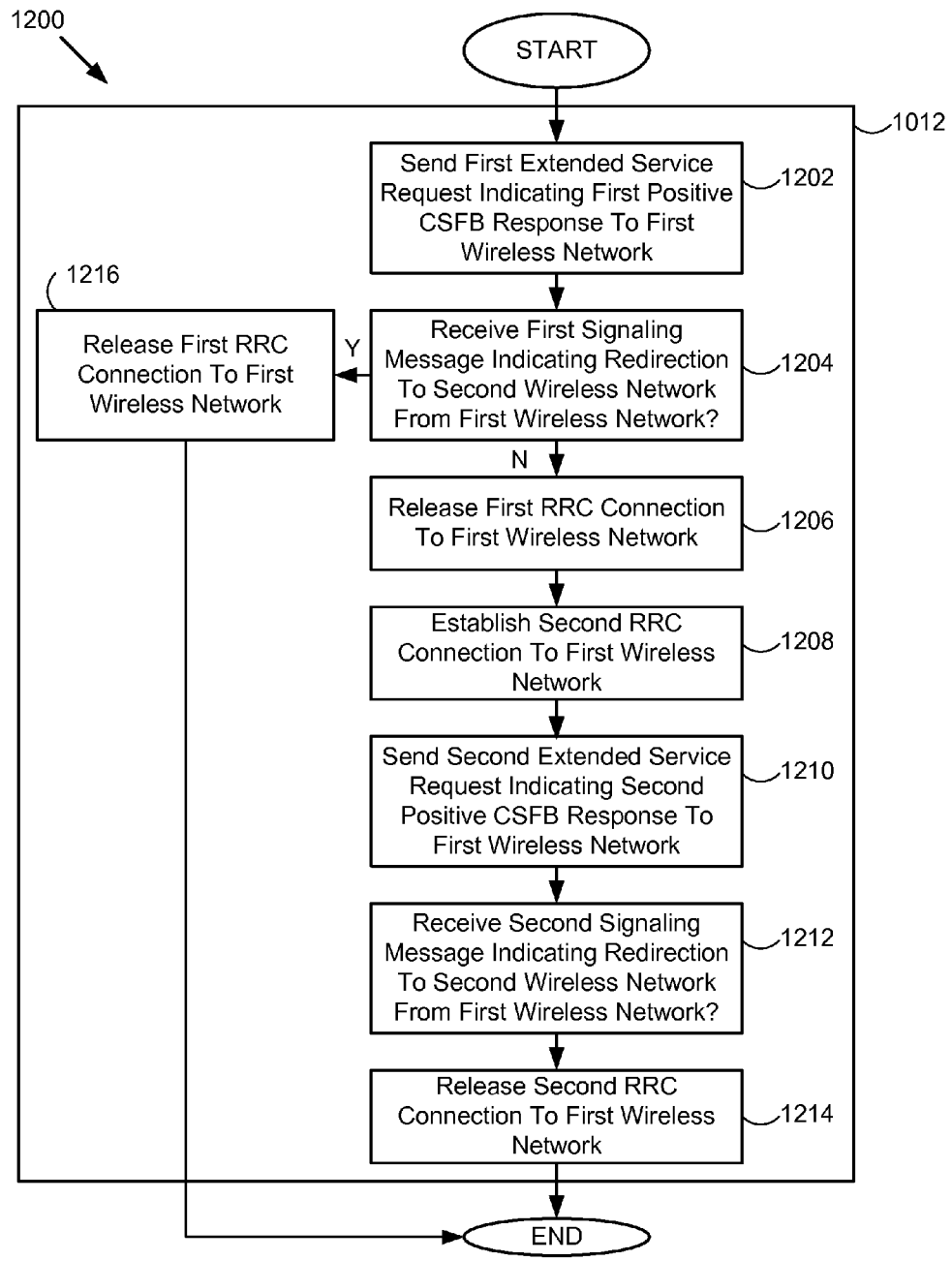

FIG. 12 illustrates a diagram 1200 of another representative embodiment of method steps to disconnect the mobile wireless device from the first wireless network applicable to the method of FIG. 10. In a representative embodiment, the method step 1012 of the method illustrated in FIG. 10 includes one or more of the steps illustrated in FIG. 12. In step 1202, the mobile wireless device 102 sends a first extended service request message to the first wireless network, the first extended service request message indicating a positive circuit switched fallback (CSFB) response to the received paging message. In step 1204, the mobile wireless device 102 can determine whether a first signaling message indicating redirection of the mobile wireless device 102 to a second wireless network is received from the first wireless network in response to the first extended service request message. If the mobile wireless device 102 receives a response from the first wireless network to the first extended service request message, then the mobile wireless device 102 can release a first RRC connection to the first wireless network in step 1216 and end this portion of the method. If the mobile wireless device 102 does not receive a response from the first wireless network to the first extended service request message, in step 1206, the mobile wireless device 102 can release the first RRC connection to the first wireless network and subsequently establish a new second RRC connection to the first wireless network in step 1208. Having established the second RRC connection to the first wireless network, the mobile wireless device 102 can, in step 1210, send a second extended service request message to the first wireless network, the second extended service request message including a positive CSFB response indication. In step 1212, the mobile wireless device 102 can receive a second signaling message from the first wireless network, the second signaling message indicating a redirection of the mobile wireless device 102 to the second wireless network. In step 1214, the mobile wireless device 102 can release the second RRC connection to the first wireless network. In an embodiment, having released the first RRC connection and/or the second RRC connection to the first wireless network and having received a response from the first wireless network to the extended service request, the response redirecting the mobile wireless device 102 to the second wireless network, the mobile wireless device 102 can subsequently establish a connection through the second wireless network, e.g., to establish a mobile terminated voice connection.

Figure 13:
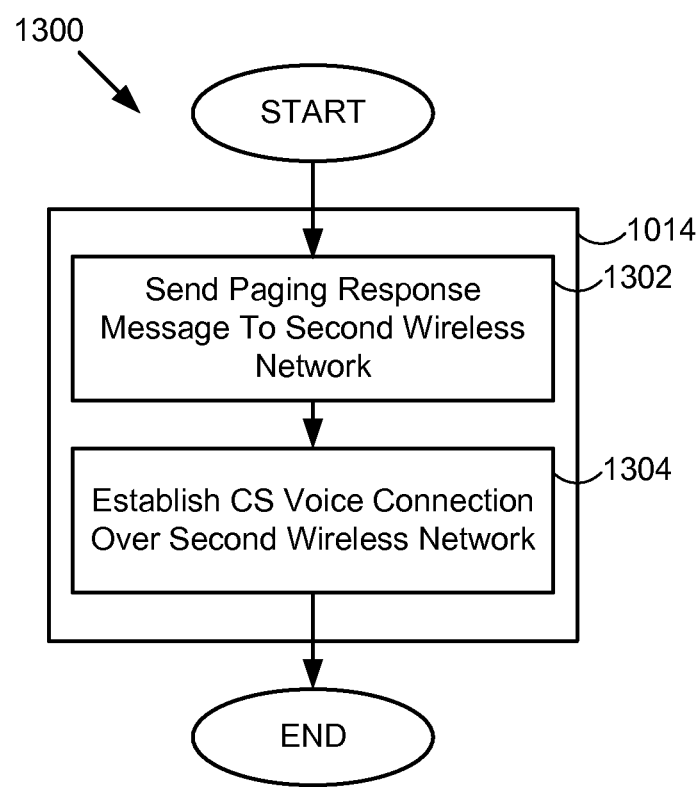
FIG. 13 illustrates a representative embodiment of method steps to establish a connection between the mobile wireless device and a second wireless network applicable to the method of FIG. 10.

FIG. 13 illustrates a diagram 1300 of a representative embodiment of method steps to establish a connection between the mobile wireless device and a second wireless network applicable to the method of FIG. 10. In an embodiment, the mobile wireless device executes the steps of FIG. 13 following either the steps of FIG. 11 or the steps of FIG. 12. In a representative embodiment, the method step 1014 of the method illustrated in FIG. 10 includes one or more of the steps illustrated in FIG. 13. In step 1302, the mobile wireless device 102 sends a paging response message to the second wireless network. In step 1304, the mobile wireless device 102 establishes a circuit switched voice connection over the second wireless network.

Software, hardware, or a combination of hardware and software can implement various aspects of the described embodiments. The described embodiments can also be encoded as computer program code on a non-transitory computer readable medium. The non-transitory computer readable medium is any data storage device that can store data that can thereafter be read by a computer system. Examples of the non-transitory computer readable medium include read-only memory, random-access memory, CD-ROMs, HDDs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A method to respond to paging messages by an apparatus of a mobile wireless device, the method comprising:
by the apparatus of the mobile wireless device:
receiving, from a first wireless network while in a radio resource control (RRC) connected state, a paging message that uniquely identifies the mobile wireless device, originates from a second wireless network, and is not a public warning system message; and
in response to receipt of the paging message while in the RRC connected state:
disconnecting the mobile wireless device from the first wireless network by releasing a first RRC connection to the first wireless network locally in the mobile wireless device by at least changing an internal state of the mobile wireless device from the RRC connected state to an RRC idle state,
establishing a second RRC connection to the first wireless network,
responding to the paging message via the second RRC connection,
and
subsequently establishing a connection of the mobile wireless device to the second wireless network.

2. The method recited in claim 1, wherein responding to the paging message comprises sending an extended service request to the first wireless network indicating a positive circuit-switched fall back (CSFB) response; and the method further comprises:
receiving, via the second RRC connection, a signaling message from the first wireless network indicating redirection to the second wireless network.

3. The method recited in claim 1, wherein receipt of the paging message while in the RRC connected state indicates a connection state for the mobile wireless device maintained by the first wireless network is an RRC idle state.

4. The method recited in claim 1, wherein the paging message comprises a core network (CN) domain information element (IE) set to a circuit-switched (CS) domain.

5. The method recited in claim 1, wherein the paging message is not a circuit-switched (CS) service notification message for initiating a CS fallback (CSFB) procedure when the mobile wireless device is in the RRC connected state.

6. The method recited in claim 1, wherein the public warning system message comprises a commercial mobile alert service (CMAS) message or an earthquake and tsunami warning system (ETWS) message.

7. The method recited in claim 1, wherein the paging message includes a user equipment (UE) information element (IE) that indicates the paging message is intended for the mobile wireless device.

8. The method recited in claim 1, wherein the first wireless network operates according to a long term evolution (LTE) wireless communication protocol, and the second wireless network operates according to a non-LTE wireless communication protocol.

9. The method recited in claim 1, wherein the paging message includes an indication of an incoming mobile terminated voice call for the mobile wireless device to be completed over the second wireless network.

10. An apparatus comprising:
processing circuitry configurable to control establishing and releasing connections with a first wireless network and a second wireless network;

wireless circuitry configurable to communicate with the first wireless network according to a first wireless communication protocol and the second wireless network according to a second wireless communication protocol;

wherein execution of instructions by the processing circuitry causes the apparatus to:
receive, from the first wireless network, while in a radio resource control (RRC) connected state, a paging message that uniquely identifies a mobile wireless device, originates from the second wireless network, and is not a public warning system message; and
in response to receipt of the paging message while in the RRC connected state:
disconnect from the first wireless network by releasing a first RRC connection to the first wireless network locally in the mobile wireless device by at least changing an internal state of the mobile wireless device from the RRC connected state to an RRC idle state,
establish a second RRC connection to the first wireless network,
respond to the paging message via the second RRC connection, and
subsequently establish a connection to the second wireless network.

11. The apparatus recited in claim 10, wherein execution of the instructions by the processing circuitry further causes the apparatus to:
respond to the paging message by at least sending an extended service request to the first wireless network indicating a positive circuit-switched fall back (CSFB) response; and
receive a signaling message from the first wireless network indicating redirection to the second wireless network.

12. The apparatus recited in claim 10, wherein receipt of the paging message while in the RRC connected state indicates a connection state for the mobile wireless device maintained by the first wireless network is an RRC idle state.

13. The apparatus recited in claim 10, wherein the paging message comprises a core network (CN) domain information element (IE) set to a circuit-switched (CS) domain.

14. The apparatus recited in claim 10, wherein the paging message is not a circuit-switched (CS) service notification message for initiating a CS fallback (CSFB) procedure when the mobile wireless device is in the RRC connected state.

15. A non-transitory storage device storing computer-executable instructions that, when executed, cause an apparatus to:
receive, from a first wireless network, while in a radio resource control (RRC) connected state, a paging message that uniquely identifies a mobile wireless device, originates from a second wireless network, and is not a public warning system message; and
in response to receipt of the paging message while in the RRC connected state:
disconnect from the first wireless network by releasing a first RRC connection to the first wireless network locally in the mobile wireless device by at least changing an internal state of the mobile wireless device from the RRC connected state to an RRC idle state,
establish a second RRC connection to the first wireless network,
respond to the paging message via the second RRC connection, and
subsequently establish a connection to the second wireless network.

16. The non-transitory storage device recited in claim 15, wherein execution of the computer-executable instructions further causes the apparatus to:
respond to the paging message by at least sending an extended service request to the first wireless network indicating a positive circuit-switched fall back (CSFB) response; and
receive a signaling message from the first wireless network indicating redirection to the second wireless network.

17. The non-transitory storage device recited in claim 15, wherein receipt of the paging message while in the RRC connected state indicates a connection state for the mobile wireless device maintained by the first wireless network is an RRC idle state.

18. The non-transitory storage device recited in claim 15, wherein:
the paging message comprises a core network (CN) domain information element (IE) set to a circuit-switched (CS) domain, and
the paging message is not a circuit-switched (CS) service notification message for initiating a CS fallback (CSFB) procedure when the mobile wireless device is in the RRC connected state.

19. The non-transitory storage device recited in claim 15, wherein the paging message includes a user equipment (UE) information element (IE) that indicates the paging message is intended for the mobile wireless device.

20. The non-transitory storage device recited in claim 15, wherein the paging message includes an indication of an incoming mobile terminated voice call for the mobile wireless device to be completed over the second wireless network.

* * * * *